United States Patent
Bartos et al.

(10) Patent No.: US 6,908,070 B2
(45) Date of Patent: Jun. 21, 2005

(54) CYLINDER VALVE INSERT

(75) Inventors: Josef A. Bartos, Pomona, CA (US); Harsharan Grewal, Diamond Bar, CA (US)

(73) Assignee: Taiwan Pao, Taipei (TW)

( * ) Notice: Subject to any disclaimer, the term of this patent is extended or adjusted under 35 U.S.C. 154(b) by 222 days.

(21) Appl. No.: 10/379,042

(22) Filed: Mar. 5, 2003

(65) Prior Publication Data

US 2004/0011984 A1 Jan. 22, 2004

Related U.S. Application Data

(60) Provisional application No. 60/397,013, filed on Jul. 22, 2002.

(51) Int. Cl.$^7$ ................................................ F16L 29/02
(52) U.S. Cl. .................... 251/149.6; 251/214; 137/242; 277/566
(58) Field of Search ........................... 251/149.1, 149.6, 251/149.9, 214, 325, 330, 339, 355, 900; 137/237, 238, 242, 244; 277/566

(56) References Cited

U.S. PATENT DOCUMENTS

| | | | | |
|---|---|---|---|---|
| 3,542,380 A | * | 11/1970 | Klein et al. | 277/639 |
| 3,550,990 A | * | 12/1970 | Carlson, Jr. et al. | 277/566 |
| 5,040,905 A | * | 8/1991 | Boyd | 384/130 |
| 5,330,155 A | * | 7/1994 | Lechner | 251/149.6 |
| 5,553,638 A | * | 9/1996 | Home | 251/149.6 |
| 5,582,201 A | * | 12/1996 | Lee et al. | 251/149.6 |
| RE35,602 E | * | 9/1997 | Lechner | 251/149.6 |
| 6,145,753 A | * | 11/2000 | Yano et al. | 251/900 |
| 6,453,933 B1 | * | 9/2002 | Oi et al. | 137/242 |

* cited by examiner

*Primary Examiner*—Eric Keasel
(74) *Attorney, Agent, or Firm*—Fay, Sharpe, Fagan, Minnich & McKee, LLP

(57) ABSTRACT

A valve insert for a cylinder valve for connecting an LPG tank to a gas consuming appliance has a body member mounted in the outlet end of the cylinder valve and a valve element slidable in the body member and cooperable therewith to control the flow of gas from the tank to the appliance. A quad sealing ring between the valve body and valve element seals against gas leakage therebetween and provides a lubricant reservoir for lubricating the surfaces thereof, and a wiper ring downstream of the quad sealing ring cleans the surfaces and precludes the ingress of foreign matter to the area of the gas sealing quad ring.

30 Claims, 2 Drawing Sheets

CYLINDER VALVE INSERT

The present invention is related to the field of valves for household and recreational vehicle use and, more particularly, to an improved valve insert which is adapted to be mounted to the outlet end of an LPG cylinder valve to improve sealing with a separable male fitting. The present invention claims priority based on U.S. Provisional Patent Application Ser. No. 60/397,013 filed Jul. 22, 2002.

BACKGROUND OF THE INVENTION

Gaseous fuels, such as butane and propane, have found a wide acceptance in household and recreational vehicle use. Such fuels are commonly used in association with gas grills, gas lamps, gas heaters, gas cutting torches, and other similar devices. When using such devices, an individual obtains a pressurized gas vessel or cylinder and then connects the vessel or cylinder to a gas consuming device. Typically, the gas consuming device operates at a pressure less than the gas pressure in the pressurized gas vessel or cylinder. As a result, a pressure regulator is mounted downstream of the valve on the pressurized gas vessel or cylinder to reduce the pressure of gas flowing through the valve and into the gas consuming device.

Presently, various safety regulations exist concerning the operation of the valve on the pressurized gas vessel or cylinder. As a result, several attempts have been made to minimize the escape or loss of gas when a gas consuming device is connected to and/or disconnected from the pressurized gas vessel or cylinder. In addition, gas escape or loss also occurs during the refilling of the gas vessel or cylinder. The most common cylinder valve insert is disclosed in U.S. Pat. No. 5,330,155 to Lechner, issued on Jul. 19,1994. Another cylinder valve insert is disclosed in U.S. Pat. No. 5,553,638 to Home, issued on Sep. 10, 1996. Still another cylinder valve insert is disclosed in U.S. Pat. No. 5,582,201 to Lee, issued on Dec. 10,1996. These three patents are incorporated herein by reference. These three cylinder valve inserts reduce the amount of gas escape or loss when a male connector is connected to the valve on the gas vessel or cylinder. However, these valve inserts still result in some gas escape or loss, especially after a male connector has been connected and disconnected several times from the gas vessel or cylinder.

The valve inserts of Lechner '155, Home '638 and Lee '201 are designed to be mounted to a standard cylinder valve. Each valve insert includes a tubular body, a valve member and a seal mounted to the valve member. The valve member includes a docking member designed to form a seal with a nipple of a standard connection fitting. The valve member is biased by a valve member spring thereby causing the valve member to resist movement when the nipple contacts the docking member. The valve member laterally moves in the tubular body as the nipple is further inserted into the tubular body. The lateral movement of the valve member causes the seal to move from a closed to an opened position thereby allowing gas to flow between the connection fitting and the cylinder valve.

Home '638 is directed to an improvement over Lechner '155. Home '638 discloses a tubular member having L-shaped notches designed to mate with a wrench. The L-shaped notches are designed to simplify the insertion of the tubular body into the cylinder valve. Home '638 also discloses that the valve member includes an abutment surface for engagement with a modified POL nipple. The modified POL nipple engages the docking member on the valve member in a manner to reduce gas from leaking between the POL nipple and the valve member. Home '638 discloses that the modifications to the valve member and the POL nipple overcome a problem associated with the valve insert disclosed in Lechner '155. Home '638 discloses that after repeated use of the Lechner valve insert, the strength of the spring may weaken, resulting in the POL nipple not hermetically engaging the docking member prior to the seal moving to an opened position.

Although the arrangement disclosed in Home '638 may overcome a design shortcoming of Lechner '155, the redesigned valve insert of Home '638 has its own shortcomings. The modified POL nipple is designed to contact and abut a surface on the valve member to cause the valve member to move laterally. Prior to the valve member moving, the contoured surfaces of the POL nipple form a seal with the docking member on the valve member.

Lee '201 discloses a valve insert that is similar to the valve insert of Lechner '155 and Home '638. The valve insert has a spring positioned on the end of the seal instead of between the tubular body and valve member as shown in Lechner '155 and Home '638.

All these valve inserts initially function in their desired manner. However, after repeated connection and disconnection of the nipple from the valve member, the movement of the valve member in the tubular member of the valve insert can become impaired. The seals between the valve member and the tubular member can become worn thereby impairing the movement of the valve member in the tubular member. This impaired movement can cause the valve member to stick in the opened position and/or cause the seal between the nipple and the docking member to be prematurely compromised when the nipple is withdrawn from the valve member, thereby causing a gas leak. A lubricant can be inserted between the valve member and the tubular member to reduce wear of the seal and inhibit sticking of the valve member. However, after repeated connection and disconnection, the lubricant is wiped off regions between the valve member and the tubular member. This wiping of the lubricant results in the valve member being susceptible to sticking in these wiped regions. Dirt and other foreign material can also impair the movement of the valve member in the tubular member by becoming wedged between the valve member and tubular member.

In view of the disadvantages of present valve inserts, there is a continued demand for a valve insert that ensures adequate sealing with a separable male connection and that minimizes the loss or escape of gaseous fuel when the cylinder valve is disconnected and re-connected to the male connection.

SUMMARY OF THE INVENTION

The present invention is related to the field of valves, and, more particularly, to an improved insert which is adapted to be mounted to the outlet end of a cylinder valve to improve the sealing engagement with a separable male fitting. The invention is particularly directed to LPG cylinder valves for household and recreational vehicle use and will be particularly described with reference thereto. However, the invention has broader applications and can be used in any type of fluid valve, wherein the prevention of leaking or escaping fluid (e.g. gas and/or liquid) is desired.

In accordance with the present invention, a cylinder valve, such as, but not limited to, a LPG cylinder valve, includes a valve insert designed to reduce or prevent leakage of fluid from the cylinder valve when a fluid connector is connected to and/or disconnected from the cylinder valve. The valve insert can be removably or irremovably mounted in the cylinder valve. When the valve insert is removably mounted in the cylinder valve, the valve insert can be connected to the cylinder valve in a variety of manners such as, but not limited to, a threaded arrangement, a snap ring arrangement, a bolt or screw arrangement, a latch arrangement, and the like. When the valve insert is irremovably mounted in the cylinder valve, the valve insert can also be connected to the cylinder valve in a variety of manners such as, but not limited to, gluing, welding, brazing, soldering, riveting, and the like. Alternatively, the interior of the cylinder valve can be configured by molding, machining, or the like to integrally form one or more components of the valve insert in the cylinder valve.

In accordance with one aspect of the present invention, the valve insert is mounted as a unit on or in a cylinder valve outlet to selectively enable a flow of fluid therethrough when a fluid connector in the form of a nipple component is sufficiently engaged therewith, and to prevent such fluid flow when the cylinder valve and nipple component are sufficiently separated from one another. The valve insert includes a body member, a valve element, a seal member on the valve element, and a valve element biasing member. The body member is adapted to be sealingly mounted on the cylinder valve and, in the preferred embodiment, the body member is cylindrical having an outwardly-facing surface that engages a corresponding contoured inner surface of the cylinder valve. The inner surface of the cylinder valve is threaded, and the outwardly-facing surface of the body member is threaded to enable the body member to threadedly interengage with the cylinder valve. The body member has a seal seat facing upstream with respect to the direction of fluid flow through the cylinder valve and an abutment surface downstream of the seat and facing in the downstream direction for limiting displacement of the valve element relative to the body member in the opening direction.

The valve element is axially slidable in the body member, and the downstream end of the valve element including a docking arrangement adapted to sealingly engage the nose portion of the nipple component as the nipple is connected to the cylinder valve. The upstream end of the valve element includes a seal member adapted to engage the seat on the body member to close the cylinder valve and, in response to displacement of the valve element in the upstream direction, to open the cylinder valve outlet for the flow of gas therethrough. Such displacement of the valve element occurs in response to coupling the nipple component to the downstream end of the cylinder valve outlet. A valve element biasing spring exerts a biasing force on the valve element to continuously urge the latter to move to the closed position.

In accordance with another aspect of the present invention, the valve insert includes one or more sealing members to optimize sealing against fluid leaks through the valve insert and/or to the ingress of foreign matter to the sealing areas which can adversely affect the operation of one or more components of the valve insert. The sealing members preferably are sealing rings of resilient material such as rubber. In one embodiment, the surfaces between the body member and the valve element are sealed against gas leakage by a quad seal ring. The design of the quad seal ring allows for lubricant to be maintained between the cavities of the quad seal ring thereby continuously lubricating the surfaces between the body member and the valve element when the valve element moves. In a particular configuration of the quad seal ring, the latter has a four lobed cross-sectional shape which includes a recess between two adjacent lobes. A lubricant, if used, is typically applied in the recess between the lobes of the quad seal ring. The recesses of the quad seal ring trap a portion of the lubricant thereby lubricating the surfaces facing the body member and the valve element each time the valve element moves within the body member. The lubricating surfaces inhibit or prevent sticking of the valve element in the body member. Preferably, the quad sealing member is received in a recess in the valve element so as to move therewith. In accordance with another aspect of this embodiment, at least one wiping sealing ring for excluding foreign matter is mounted on the body member for engagement with the valve element in an area downstream of the seal provided to preclude gas leakage. The wiper ring inhibits or prevents the ingress of foreign materials between the valve element and the body member to the area engaged by the leakage sealing ring and thus minimizes or prevents erosion of the sealing ring, scratching of the body member and/or restriction of movement of the valve element within the body member. The wiper ring also facilitates displacement and/or removal of foreign material that has settled between the valve element and the body member downstream of the wiper ring when the valve element moves in the downstream direction within the body member. When the leakage sealing ring is the preferred quad ring, the wiper ring also inhibits or prevents lubricant from escaping between the wiper ring and the quad seal ring, thereby promoting continued lubrication. While it is preferred to mount the quad ring on the valve element and the wiper ring on the body member, both of the sealing rings can be mounted on the same one of the body member or valve element. The docking arrangement on the downstream end of the valve element includes a sealing member for sealing engagement with the portion of the nipple as the nipple is connected to the cylinder valve by a coupling nut. As the coupling nut is advanced onto the cylinder valve, the valve element is displaced upstream against the force of the biasing spring which thus opposes movement of the valve element in the body member and optimizes sealing engagement between the nose and the docking seal member. The latter sealing precludes leakage of gas between the insert and nipple when the latter is advanced inwardly of the cylinder valve to open the latter for the flow of gas through the insert and nipple-to the point of use.

The principal object of the present invention is to provide an insert for a cylinder valve which reduces the leakage or escape of gas when a fluid connector is connected to and/or disconnected from the cylinder valve.

Another objective of the present invention is to provide a valve insert that is simple to use and has a longer use-life then that of inserts heretofore available.

Still another objective of the present invention is to provide a valve insert that includes components that promote relative displacement with minimal wear therebetween.

A further object is the provision of a valve insert having an improved gas leakage sealing arrangement between relatively displaceable parts thereof and improved protection against the ingress of foreign matter to the area of the leakage sealing arrangement.

These and other objects and advantages will become apparent to those skilled in the art upon the reading and following of this description taken together with the accompanied drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF THE PREFERRED EMBODIMENTS

Figure 1:
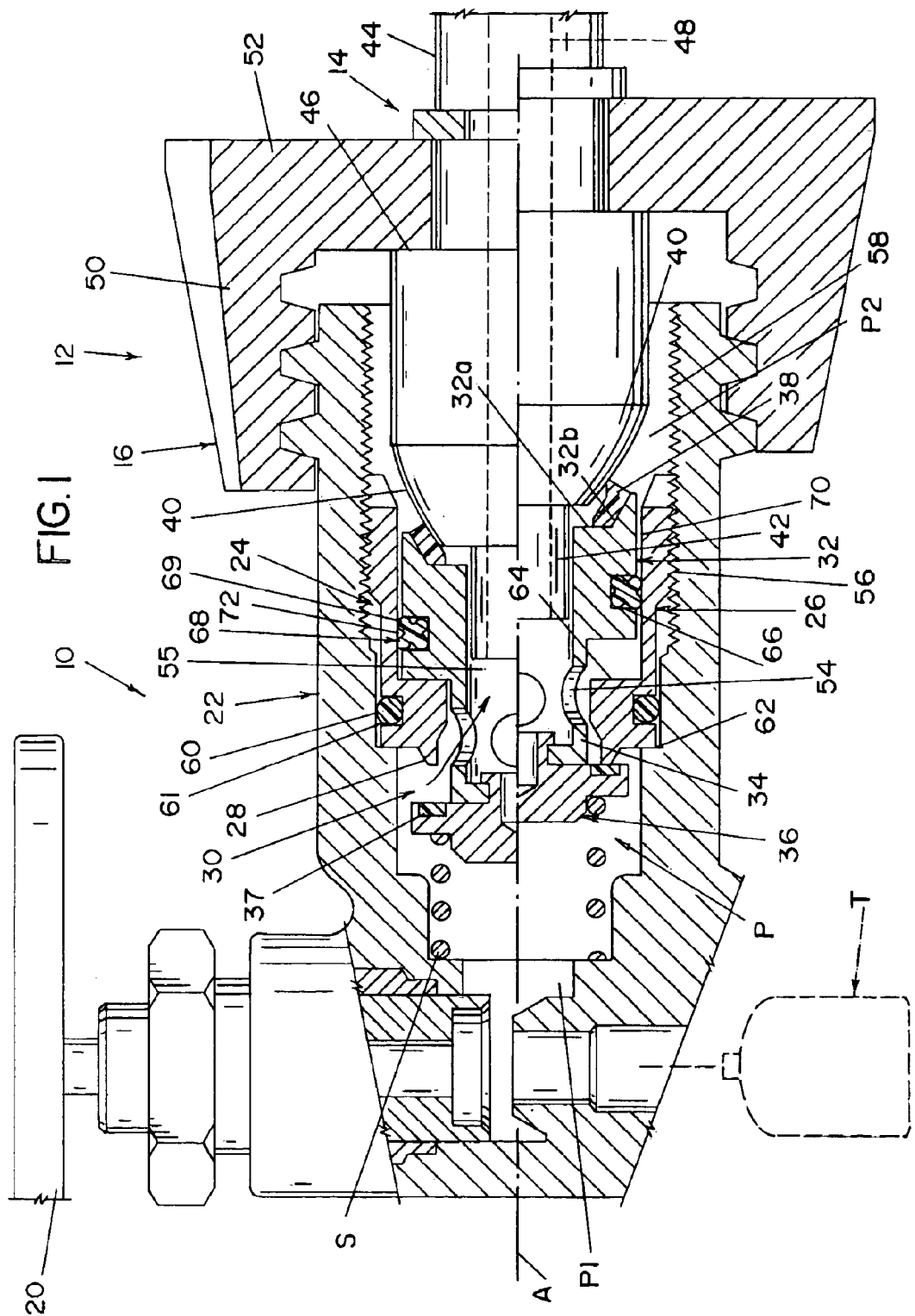
FIG. 1 is a cross-sectional elevation view showing a valve insert in accordance with the present invention mounted in a cylinder valve outlet, and a nipple and coupling nut engaging the valve element of the insert in the fully open and closed positions thereof.

Referring now in greater detail to the drawings, wherein the showings are for the purpose of illustrating the preferred embodiments of the invention only and not for the purpose of limiting the invention, FIG. 1 illustrates an arrangement for connecting an LPG tank T with a gas consuming appliance such as a propane gas grill, not shown, and which arrangement comprises a cylinder valve 10 mounted on tank T, and a coupling 12 for connecting valve 10 with the appliance. Coupling 12 comprises a nipple 14 and a coupling nut 16. As is well known, valve 10 includes a primary shutoff valve element 18 operable through a knob or handle 20 to open and close valve 10 to the flow of gas from tank T through a passageway P defined by a conduit portion 22 of valve 10. Passageway P has an axis A, an upstream end P1 for receiving gas from tank T when valve 18 is open, and a downstream end P2 for delivering gas to the appliance. As is further well known, conduit 22 receives and supports a valve insert 24 in passageway P which, in the embodiment illustrated, includes a cylindrical body member 26 having upstream and downstream ends and valve seat 28 facing upstream at the upstream end of the body member. The insert further includes valve element 30 slidably received in the body member and biased toward seat 28 by a spring S. Valve element 30 comprises a cylindrical downstream actuating portion 32, an intermediate tubular portion 34 extending through seat 28 and an upstream head portion 36 which carries a sealing element 37 for engagement with seat 28. The downstream end of actuator portion 32 is provided with angularly related abutment surfaces 32a and 32b which receive annular resilient seal 38 for the purpose set forth hereinafter. Nipple 14 include a nose portion 40 having a probe component 42 at the forward or upstream end thereof and a shank portion 44 extending downstream from nose 40 and the downstream end of which, not shown, is externally threaded for connection with a pressure regulator, not shown, which is connected to the use appliance. Probe 42 facilitates guidance of the nipple into alignment with valve actuating portion 32 of the valve element during assembly. A radially outwardly extending circumferential shoulder 46 is provided between nose 40 and the upstream end of shank 44, and the nipple includes a passageway 48 therethrough for the flow of gas from tank T to the pressure regulator. Nipple 14 is removably connected to the tank valve by coupling nut 16 which, for the latter purpose, includes an internally threaded sleeve or skirt portion 50 for mating engagement with external threads on conduit 22 of the tank valve. Further, nut 16 includes a radially inwardly extending end wall 52 which is apertured to receive nipple shank 44 and the radially inner edge portion of which engages against shoulder 46 to displace nipple 14 to the left in FIG. 1 in connection with an assembly operation.

As will be appreciated from the upper and lower portions of the tank valve in FIG. 1, valve element 30 respectively has open and closed positions relative to valve seat 28 and in which position nose 40 of nipple 14 respectively engages against and is spaced from sealing element 38. Accordingly, it will be appreciated that movement of nose 40 to the left in FIG. 1 by screwing coupling nut 16 onto conduit 22 displaces the nose from the position shown in the lower portion of the drawing to the position shown in the upper portion. This causes the nose to engage and compress sealing element 38 and, thereafter, to displace valve element 30 to the left against the bias of spring S to displace head portion 36 and thus sealing element 37 away from seat 28 to the open position of the valve element. In the open position of valve element 30, gas can flow from tank T around head portion 36, across seat 28 and into intermediate portion 34 through ports 54, and then through passageway 55 in portion 32 and into nipple passageway 48. When nipple 14 is displaced to the right in FIG. 1 from the open position of valve element 30 by unscrewing the coupling nut, spring S biases the valve element to the right for sealing element 37 to engage with seat 28 to shut off the gas flow from tank T through discharge conduit 22 of the tank valve.

Valve insert body member 26 has an outer threaded portion 56 for threadedly engaging with internal threaded portion 58 of outlet conduit 22 of the cylinder valve. An O-ring seal 60 is positioned in a recess 61 extending about the outer periphery of the upstream end 26 to sealingly engage with the inner surface of the outlet conduit of the cylinder valve. The valve insert is mounted in the cylinder valve by screwing body member 26 into the outlet conduit until the body member engages a stop shoulder 62 in the outlet conduit. Body member 26 has an abutment shoulder 64 which is adapted to be engaged by the upstream end of the actuator portion 32 of valve element 30 to limit movement of the latter in the opening direction.

Figure 1A:
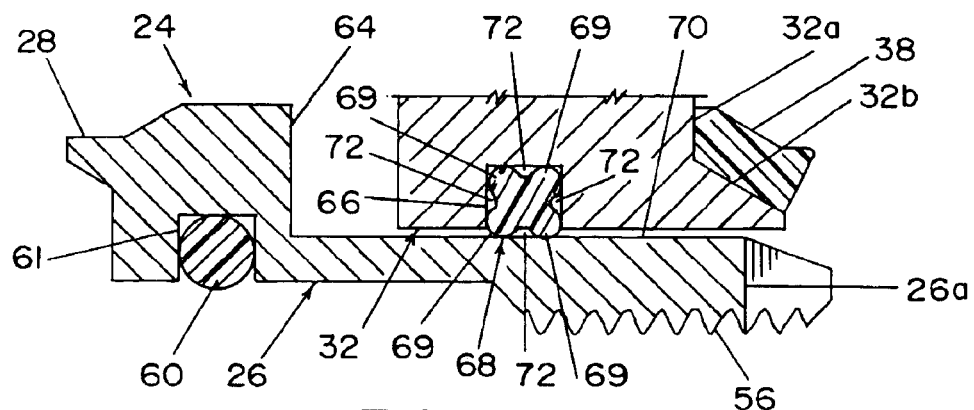
FIG. 1A is an enlarged detail view, in section, of the quad ring seal between the valve element and body member of the valve insert.

In accordance with one aspect of the invention, as best seen in FIG. 1A, valve element 30 is provided with a peripheral recess 66 in the outer surface of actuating portion 32 which is designed to retain a quad seal ring 68 for sliding and sealing engagement with the inner surface 70 of the body member. The quad seal ring has axially opposite sides and a four lobed cross-sectional shape which provides lobes 69 in axially spaced apart and radially spaced apart pairs and a recess 72 between adjacent ones of the lobes. A lubricant is applied to the surfaces of the quad seal ring and body member surface 70, and the recesses of the quad seal ring provide lubricant reservoirs which trap a portion of the lubricant thereby lubricating surface 70 each time the quad seal ring moves with the valve element relative to the body member.

Figure 2:
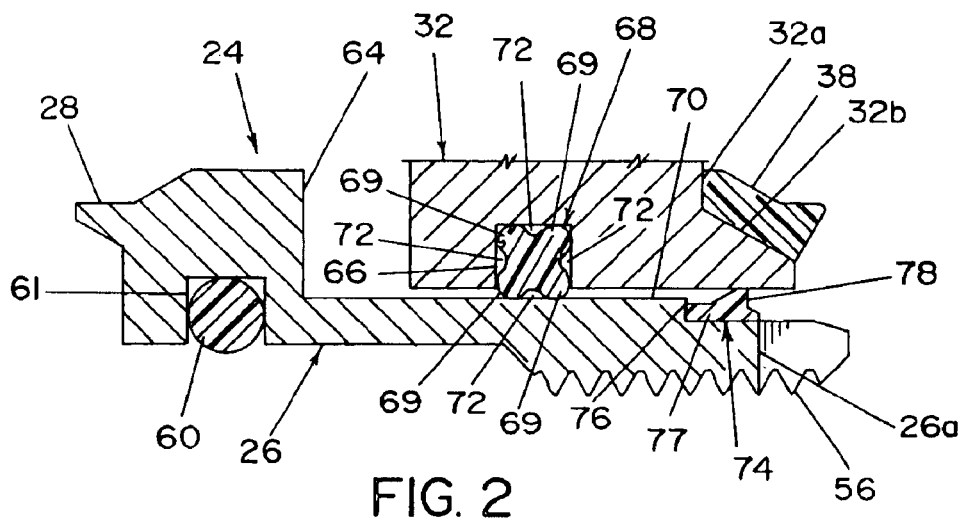
FIG. 2 is an enlarged cross-sectional elevation view of a portion of the valve insert and showing a modified sealing arrangement between the body member and the valve element; and, FIG. 3 is a cross-sectional elevation view of a portion of the valve insert and showing another modified sealing arrangement between the body member and the valve element.

Referring now to FIG. 2, a modification of the sealing arrangement between body member 26 and valve element 30 of the insert is illustrated. The basic structure of the valve insert is the same as shown in FIG. 1, thus the same components are numbered the same for purposes of consistency. The structural difference is in the addition of a wiper seal ring 74 or rubber, of the like, at the downstream end of body member 26. More particularly in this respect, the inner surface of body member 26 is provided with a circumferential recess 76 which extends axially thereinto from the downstream end 26a of body member 26 to receive wiper ring 74 and, preferably, the wiper ring is molded and vulcanized in place in the recess. Wiper ring 74 has a base 77 recess 76 and a radially inwardly extending, circumferentially continuous rib or projection 78 which slidably engages the outer surface of actuator portion 32 of valve element 30 downstream from quad ring seal 68, whereby the wiper ring seals the area between the opposed surfaces of the body member and valve element to preclude the ingress of foreign matter to the area of quad seal 68. Further, the wiper ring axially extends the area of the lubrication cavity from the quad seal toward the downstream end of the body member, thus improving the lubricating capability and reducing any tendency for the valve element to stick in one or both the open and closed positions thereof. Still further, when the valve moves from the closed position toward the open position, the wiper ring removes foreign matter which may have accumulated on the outer surface of the valve element downstream of the wiper ring during non-use of the cylinder valve.

Figure 3:
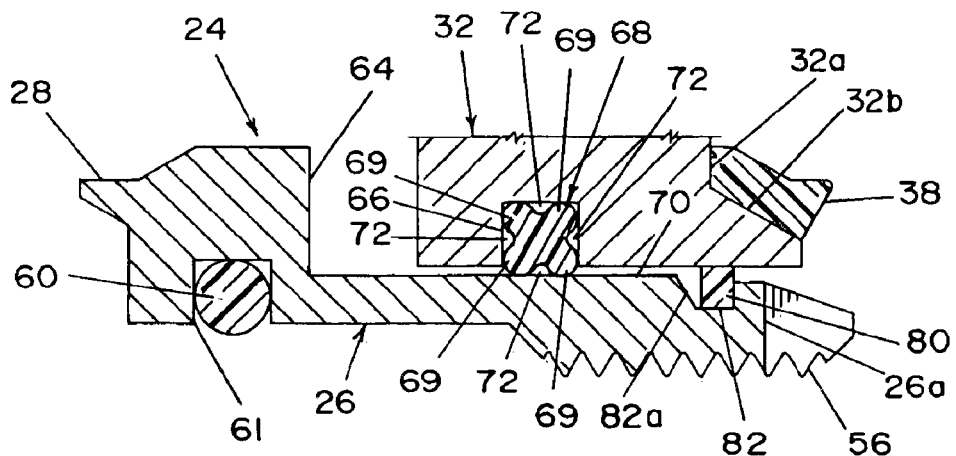

Another modification of the sealing arrangement is shown in FIG. 3. Again, the basic structure of the valve insert is the same as shown in FIG. 1, whereby the same components are numbered the same for purposes of consistency. In this embodiment, a wiper ring 80 of rubber, or the like is received in a circumferential groove 82 in the inner surface of body member 26 inwardly adjacent downstream end 26*a* thereof. Ring 80 is rectangular in cross-section, and slot 82 has an axially inwardly inclined inner end wall 82*a* which facilitates flexure of the wiper ring during relative displacement between the body member and valve element. Wiper ring 80 functions essentially the same as ring 68 discussed above.

While it is preferred in connection with the combined gas leakage and wiper ring arrangements shown in FIGS. 2 and 3 to use a quad seal ring to preclude gas leakage, it will be appreciated that the provision of a sealed lubricating cavity between the gas seal and wiper seal can be obtained with, for example, an O-ring seal in place of the quad seal.

The invention has been described with reference to preferred embodiments and it is believed that many modifications of the preferred embodiments disclosed will readily suggest to those skilled in the art upon reading and understanding the detailed description of the invention. In particular in this respect, it will be appreciated that structural shapes other than a quad ring can be provided for the gas sealing ring to provide a lubrication reservoir or reservoirs between axially opposite sides of the ring. It is intended to include all such modifications insofar as they come within the scope of the present invention.

Having thus described the invention, it is so claimed:

1. A valve insert for a cylinder valve for connecting an LPG tank to gas consuming equipment, said cylinder valve including a passageway therethrough having an axis, an upward end for receiving gas from said tank and a downstream end for connection with the gas consuming equipment, said insert comprising a cylindrical body member mounted in said passageway coaxial therewith and having upstream and downstream ends and an upstream facing annular valve seat at said upstream end, a valve element axially slidably received in said body member and having an upstream end upstream of said valve seat and a downstream end downstream from said valve seat, a sealing member on said upstream end of said valve element for engaging and disengaging said valve seat respectively in response to displacement of said valve element downstream and upstream with respect to said body member to respectively close and open said passageway for the flow of gas therethrough from said tank, a spring biasing said valve element downstream to close said passageway, a sealing ring for engagement between said body member and said valve element downstream of said valve seat to seal against gas leakage between said body member and valve element, said sealing ring having axially opposite sides and an annular space therebetween for receiving and retaining a lubricant, and a wiper ring between said body member and valve element downstream from said sealing ring for sealing against the ingress of foreign matter to said sealing ring.

2. A valve insert according to claim 1, wherein said sealing ring is mounted on said valve element for displacement therewith.

3. A valve insert as defined in claim 2, wherein said sealing ring is an x-shaped ring having pairs of lobes axially and radially spaced apart to provide a lubricant retaining recess between adjacent ones of the lobes.

4. A valve insert according to claim 3, wherein adjacent ones of said pairs of radially spaced apart lobes have first arcuate lobe surfaces extending in a first axial direction and arcuate connecting surfaces between said first lobe surfaces and extending in a second axial direction opposite said first axial direction, and wherein adjacent ones of said pairs of axially spaced apart lobes have second arcuate lobe surfaces extending in a first radial direction and arcuate connecting surfaces between said second lobe surfaces and extending in a second radial direction opposite said first radial direction.

5. A valve insert according to claim 1, wherein said sealing ring is a-quad an x-shaped ring having pairs of lobes axially and radially spaced apart to provide a lubricant retaining recess between adjacent ones of the lobes.

6. A valve insert according to claim 1, wherein said sealing ring includes a pair of axially spaced apart lobes providing said opposite sides and having arcuate lobe surfaces extending in a first radial direction and an arcuate connecting surface between said lobe surfaces extending in a second radial direction opposite said first radial direction.

7. A valve insert according to claim 6, wherein said sealing ring is mounted on said valve element for displacement therewith.

8. A valve insert according to claim 1, said wiper ring in mounted on said body member.

9. A valve insert according to claim 8, wherein said wiper ring includes a base portion adhered to said body member and a radially extending circumferentially continuous rib engaging said valve element.

10. A valve insert according to claim 1, wherein said wiper ring has a base attached to one of said body member and said valve element and a radially extending circumferentially continuous rib engaging the other of said body member and valve element.

11. A valve insert according to claim 10, wherein said wiper ring is molded and vulcanized on said body member.

12. A valve insert according to claim 1, wherein one of said body member and said valve element includes a circumferential groove receiving said wiper ring.

13. A valve insert according to claim 12, wherein said groove includes axially opposite side walls, one of said side walls being transverse to said axis, and the other of said walls being spaced axially inwardly of said one side wall and inclined axially inwardly relative thereto.

14. A valve insert according to claim 13, wherein said groove has an axially extending bottom wall between said side walls and said wiper ring has an axial dimension no greater than that of said bottom wall.

15. A valve insert according to claim 14, wherein said wiper ring is rectangular in cross-section.

16. A valve insert according to claim 1, wherein said wiper ring has a base attached to one of said body member and said valve element and a radially extending circumferentially continuous rib engaging the other of said body member and valve element and wherein said sealing ring is an x-shaped ring having pairs of lobes axially and radially spaced apart to provide a lubricant retaining recess between adjacent ones of the lobes.

17. A valve insert according to claim 16, wherein said sealing ring is mounted on said valve element for displacement therewith and wherein said wiper ring in mounted on said body member.

18. A valve insert according to claim 1, wherein said wiper ring has a base attached to one of said body member and said valve element and a radially extending circumferentially continuous rib engaging the other of said body member and valve element and wherein said sealing ring includes a pair of axially spaced apart lobes providing said opposite sides and having arcuate lobe surfaces extending in a first radial direction and an arcuate connecting surface between said lobe surfaces extending in a second radial direction opposite said first radial direction.

19. A valve insert according to claim 18, wherein said sealing ring is mounted on said valve element for displacement therewith and wherein said wiper ring in mounted on said body member.

20. A valve insert according to claim 1, wherein one of said body member and said valve element includes a circumferential groove receiving said wiper ring and wherein said sealing ring is an x-shaped ring having pairs of lobes axially and radially spaced apart to provide a lubricant retaining recess between adjacent ones of the lobes.

21. A valve insert according to claim 20, wherein said sealing ring is mounted on said valve element for displacement therewith and wherein said wiper ring in mounted on said body member.

22. A valve insert according to claim 21, wherein said groove includes axially opposite side walls, one of said side walls being transverse to said axis, and the other of said walls being spaced axially inwardly of said one side wall and inclined axially inwardly relative thereto and wherein said groove has an axially extending bottom wall between said side walls and said wiper ring has an axial dimension no greater than that of said bottom wall.

23. A valve insert for a cylinder valve for connecting an LPG tank to gas consuming equipment, said cylinder valve including a passageway therethrough having an axis, an upstream end for receiving gas from said tank and a downstream end for connection with the gas consuming equipment, said insert comprising a cylindrical body member mounted in said passageway coaxial therewith and having upstream and downstream ends and an annular valve seat facing upstream at said upstream end of said body member a valve element axially slidably received in said body member and having an upstream end upstream of said valve seat and a downstream end downstream from said valve seat, a sealing member on said upstream end of said valve element for engaging and disengaging said valve seat respectively in response to displacement of said valve element downstream and upstream with respect to said body member to respectively close and open said passageway for the flow of gas therethrough from said tank, a spring biasing said valve element downstream to close said passageway, a sealing ring for engagement between said body member and said valve element downstream of said valve seat to seal against gas leakage between said body member and valve element, and a wiper ring between said body member and said valve element downstream from said sealing ring for sealing against the ingress of foreign matter to said sealing ring.

24. A valve insert according to claim 23, wherein said wiper ring in mounted on said body member.

25. A valve insert according to claim 24, wherein said wiper ring includes a base portion adhered to said body member and a radially extending circumferentially continuous rib engaging said valve element.

26. A valve insert according to claim 23, wherein said wiper ring has a base attached to one of said body member and said valve element and a radially extending circumferentially continuous rib engaging the other of said body member and valve element.

27. A valve insert according to claim 26, wherein said wiper ring is molded and vulcanized on said body member.

28. A valve insert according to claim 23, wherein one of said body member and said valve element includes a circumferential groove receiving said wiper ring.

29. A valve insert according to claim 28, wherein said groove includes axially opposite side walls, one of said side walls being transverse to said axis, and the other of said walls being spaced axially inwardly of said one side wall and inclined axially inwardly relative thereto and wherein said groove has an axially extending bottom wall between said side walls and said wiper ring has an axial dimension no greater than that of said bottom wall.

30. A valve insert according to claim 29, wherein said groove is in said body member and said wiper ring is rectangular in cross-section.

\* \* \* \* \*